(12) United States Patent
Ferrant

(10) Patent No.: US 6,535,987 B1
(45) Date of Patent: Mar. 18, 2003

(54) AMPLIFIER WITH A FAN-OUT VARIABLE IN TIME

(75) Inventor: Richard Ferrant, Saint Ismier (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/364,151

(22) Filed: Jul. 30, 1999

(30) Foreign Application Priority Data

Jul. 31, 1998 (FR) .............................. 98 10082

(51) Int. Cl.[7] ................................................. G06F 1/04
(52) U.S. Cl. ............................ 713/401; 716/5; 327/170
(58) Field of Search .................................. 713/400, 401, 713/500, 501, 503, 600; 716/5, 6; 327/170

(56) References Cited

U.S. PATENT DOCUMENTS

| | | | |
|---|---|---|---|
| 5,134,311 A | | 7/1992 | Biber et al. ................ 307/270 |
| 5,329,175 A | * | 7/1994 | Peterson ..................... 326/85 |
| 5,475,690 A | * | 12/1995 | Burns et al. ................ 370/519 |
| 5,734,277 A | * | 3/1998 | Hu et al. .................... 327/108 |
| 5,739,707 A | | 4/1998 | Barraclough ............... 327/112 |
| 5,926,050 A | * | 7/1999 | Proebsting .................. 327/170 |
| 6,253,356 B1 | * | 6/2001 | Kung ........................... 716/5 |

FOREIGN PATENT DOCUMENTS

EP     0445045 A1     9/1991     ........... G06F/13/40

* cited by examiner

*Primary Examiner*—Dennis M. Butler
(74) *Attorney, Agent, or Firm*—Lisa K. Jorgenson; E. Russell Tarleton; Seed IP Law Group

(57) ABSTRACT

The present invention relates to an amplifier having a fan-out which varies according to the time spent between an edge of a propagation signal and an edge of a logic input signal, the amplifier including several identical blocks, each block having an output stage connected between a data input and a data output, the data input and output being respectively connected to the data inputs and outputs of the other blocks; a delay element, the delay elements of all blocks being connected in series, the delay element of the first block receiving the synchronization signal; an edge detector, the input of which is connected to the input of the output stage; and means for inhibiting the propagation of the synchronization signal through the delay element when the signal generated by the edge detector of the preceding block is active and for activating the output stage and the edge detector when the signal generated by the delay element of the preceding block is active.

14 Claims, 6 Drawing Sheets

AMPLIFIER WITH A FAN-OUT VARIABLE IN TIME

TECHNICAL FIELD

The present invention relates to amplifiers used to provide digital data to electric lines, and more specifically to amplifiers providing data in parallel on several lines.

BACKGROUND OF THE INVENTION

Data transmitted in parallel by means of several lines are frequently used in digital circuits. Each line receives the signals provided by a buffer amplifier, and behaves as a capacitive load of this amplifier. A logic signal provided by a buffer amplifier to a capacitive load exhibits transitions having a slope which is steeper as the load capacitance is small. A logic signal is taken into account when it reaches a switching voltage threshold, this threshold being reached all the faster as the signal has transitions of steep slope.

Considering several buffer amplifiers concurrently providing respective logic signals to identical logic gates via lines having different capacitances, the logic gates take account of the signal transitions at different times.

In some applications, it may be necessary to guarantee that the signals provided at the same time are taken into account practically at the same time by the logic gates.

The capacitance of a line mainly depends on its dimensions. When a parallel bus including many lines is designed on a circuit, the lengths of each bus line is generally, for routing reasons, very different from the others, although they start from a same circuit node and end at a same circuit node. It is difficult to design a parallel bus and give the same dimensions to all bus lines. Rather than adjusting the value of the load of each buffer amplifier, the size of each amplifier may also be adjusted, according to its load. Such adjustments are complex, lengthy and of expensive implementation.

The received data may also be resynchronized, for example, by installing a D flip-flop at the end of each line and by synchronizing all flip-flops on a same synchronization signal. However, such a solution implies that the frequency of the used synchronization signal be equal to the frequency of the data signals or equal to a multiple of this frequency. If, as frequently occurs, no frequency greater than the data signal frequency is available on the circuit, one period of the data frequency passes between the data transmission over the electric lines and their resynchronization, at the output of the D flip-flops.

In some circuits, especially memory circuits, such a synchronization delay can be too high to reach a desired operating rate.

SUMMARY OF THE INVENTION

An aspect of the present invention is to provide a device enabling resynchronization of the data transmitted in parallel.

According to this aspect, the present invention provides an amplifier having a fan-out which varies according to the time spent between an edge of a synchronization signal and an edge of a logic input signal.

According to an aspect of the present invention, the amplifier includes several identical blocks, each including an output stage connected between a data input and a data output, the data input and output being respectively connected to the data inputs and outputs of the other blocks, a delay element, the delay elements of all blocks being connected in series, the delay element of the first block receiving the synchronization signal, an edge detector, the input of which is connected to the input of the output stage, and means for inhibiting the propagation of the synchronization signal through the delay element when the signal generated by the edge detector of the preceding block is active and for activating the output stage and the edge detector when the signal generated by the delay element of the preceding block is active.

According to an aspect of the present invention, the amplifier includes several identical blocks, each including an output stage connected between a data input and a data output, the data input and output being respectively connected to the data inputs and outputs of the other blocks, a delay element, the delay elements of all blocks being connected in series, the delay element of the first block receiving the synchronization signal, an edge detector, the input of which is connected to the input of the output stage, and means for inhibiting the propagation of the synchronization signal through the delay element when the signal generated by the edge detector of the preceding block is active and for inhibiting the output stage and the edge detector when the signal generated by the delay element of the preceding block is active.

According to an aspect of the present invention, each of the blocks includes a first MOS transistor of a first conductivity type connected between a first supply terminal and a data output terminal, and connected in series between a synchronization terminal and the synchronization terminal of the next block, a first inverter supplied between the first supply terminal and a second supply terminal via a second MOS transistor of the second conductivity type, a second inverter, and a delay element, the gate of the first transistor being connected to the gate of the second transistor of the next block, and being activated when both a data input signal and the signal provided to the synchronization terminal of the next block are activated.

According to an aspect of the present invention, the second inverter is connected at the output of the first inverter, and the delay element includes an adjustable current source between the second transistor and the second supply terminal, and a third inverter and a capacitor, series-connected between the output of the second inverter and the connection between the second transistor and the first inverter.

According to an aspect of the present invention, the current source is set to provide a decreasing current when the intrinsic conductivity of the transistors increases.

The foregoing aspects, features and advantages of the present invention will be discussed in detail in the following non-limiting description of specific embodiments in connection with the accompanying drawings.

DETAILED DESCRIPTION OF THE INVENTION

The present invention consists of resynchronizing digital data signals transmitted in parallel by adding a small delay to a signal having a large delay and by adding a large delay to a signal having a small delay, so that all signals finally have a constant delay.

Figure 1:
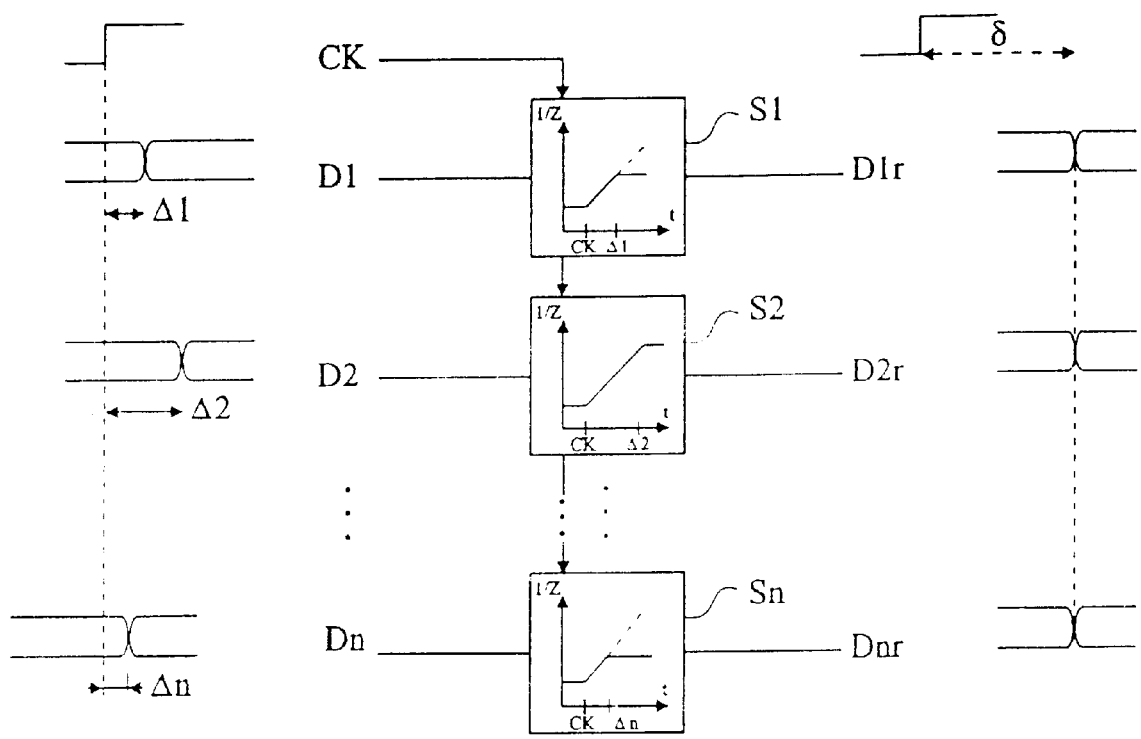
FIG. 1 shows a parallel data bus resynchronized by means of amplifiers according to the present invention.

FIG. 1 shows a bus including n lines on which are transmitted n digital data signals D (D1, D2, ... Dn) having respective delays Δ (Δ1, Δ2, ... Δn) with respect to an edge of a clock signal CK. Signals D cross amplifiers S (S1, S2, ... Sn). Amplifiers S generate delayed signals Dr (D1r, D2r, ... Dnr).

According to one aspect of the present invention, the fan-out of each amplifier S regularly increases from the edge of clock signal CK and settles at the value reached upon occurrence of an edge of the corresponding data signal. The amplifiers are preferably located at line ends, so that the outputs of amplifiers S are connected to loads of same value. Thus, the switching time of each amplifier, that is, the time required by the amplifier to bring its output to a voltage level corresponding to a logic level switching, is inversely proportional to the fan-out of the amplifier and will be the same for two amplifiers having the same fan-out and having the same output load.

Figure 2:
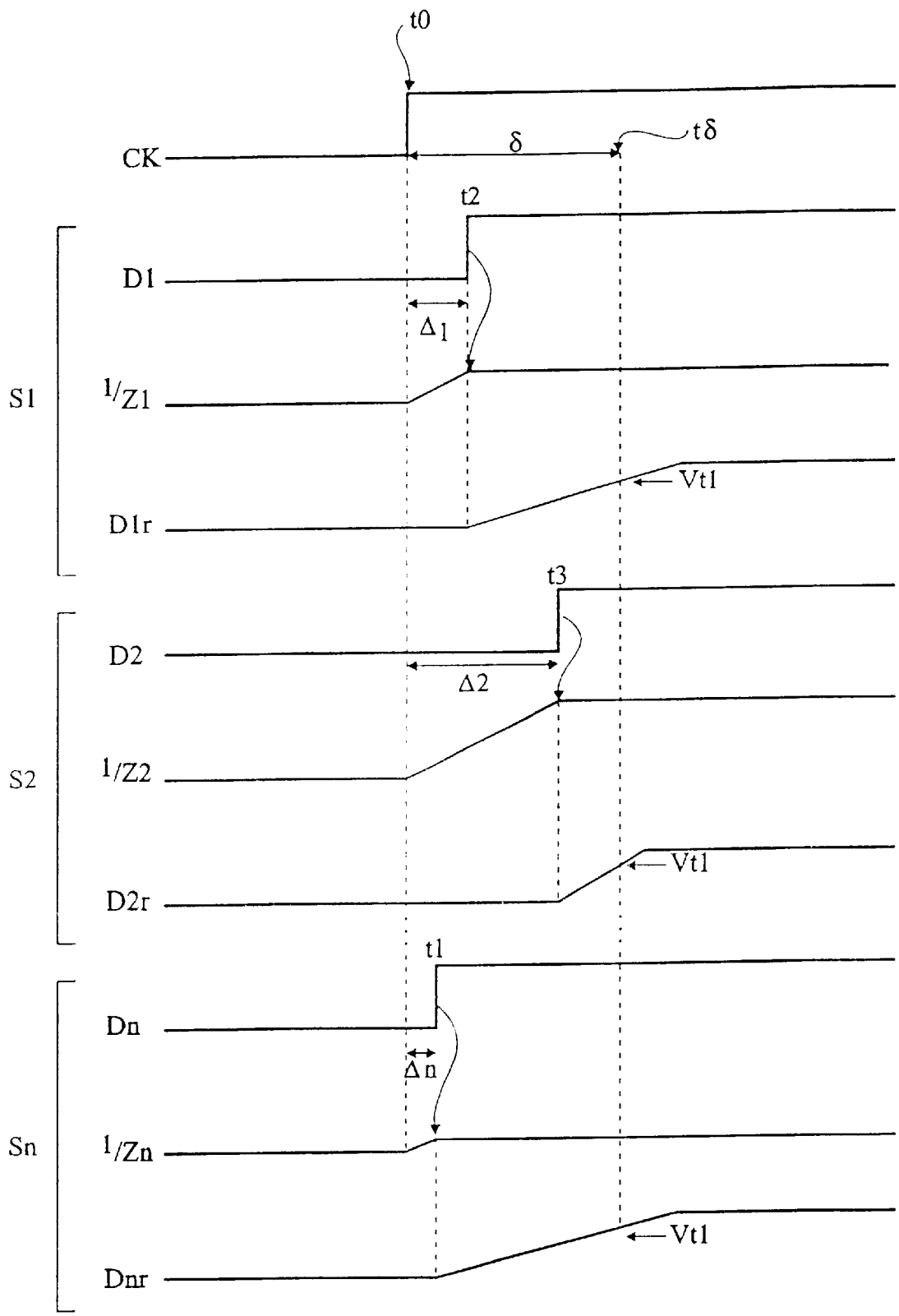
FIG. 2 shows a timing diagram illustrating the operation of the bus of FIG. 1.

FIG. 2 is a timing diagram illustrating in further detail the operation of amplifiers S (S1, S2, Sn) of FIG. 1 by means of an example. At a time $t_0$, synchronization signal CK becomes active. Fan-out 1/Z of each amplifier starts increasing according to a same predetermined slope.

At a time $t_1$, the more advanced edge of signals D, in this example an edge of signal Dn, arrives. Fan-out 1/Zn of amplifier Sn stops increasing and output signal Dnr drives its load with the reached fan-out. Since fan-out 1/Zn has not had time to reach a high value, the slope of signal Dnr is small and the switching time of amplifier Sn is long.

At a time $t_2$, an edge of signal D1, delayed with respect to the edge of signal Dn, arrives. Fan-out 1/Z1 of amplifier S1 stops increasing and output signal D1r drives its load with the reached fan-out. Fan-out 1/Z1 having reached a higher value than the preceding value 1/Zn, the slope of signal D1r is steeper than that of signal Dnr. Thus, the switching time of amplifier S1 is shorter than that of amplifier Sn.

At a time $t_3$, the most delayed edge of signals D, in this example an edge of signal D2, arrives. Fan-out 1/Z2 of amplifier S2 having reached a value higher than the preceding values 1/Z, the slope of signal D2r is steeper than that of the other signals Dr. The switching time of amplifier S2 is the shortest.

The amplifier fan-out increase slope is chosen so that all signals Dr reach a logic switching threshold $V_{t1}$ at a same time $t_δ$, that is, so that all signals Dr have a same delay $δ=t_δ-t_0$ with respect to the edge of the synchronization signal.

Figure 3:
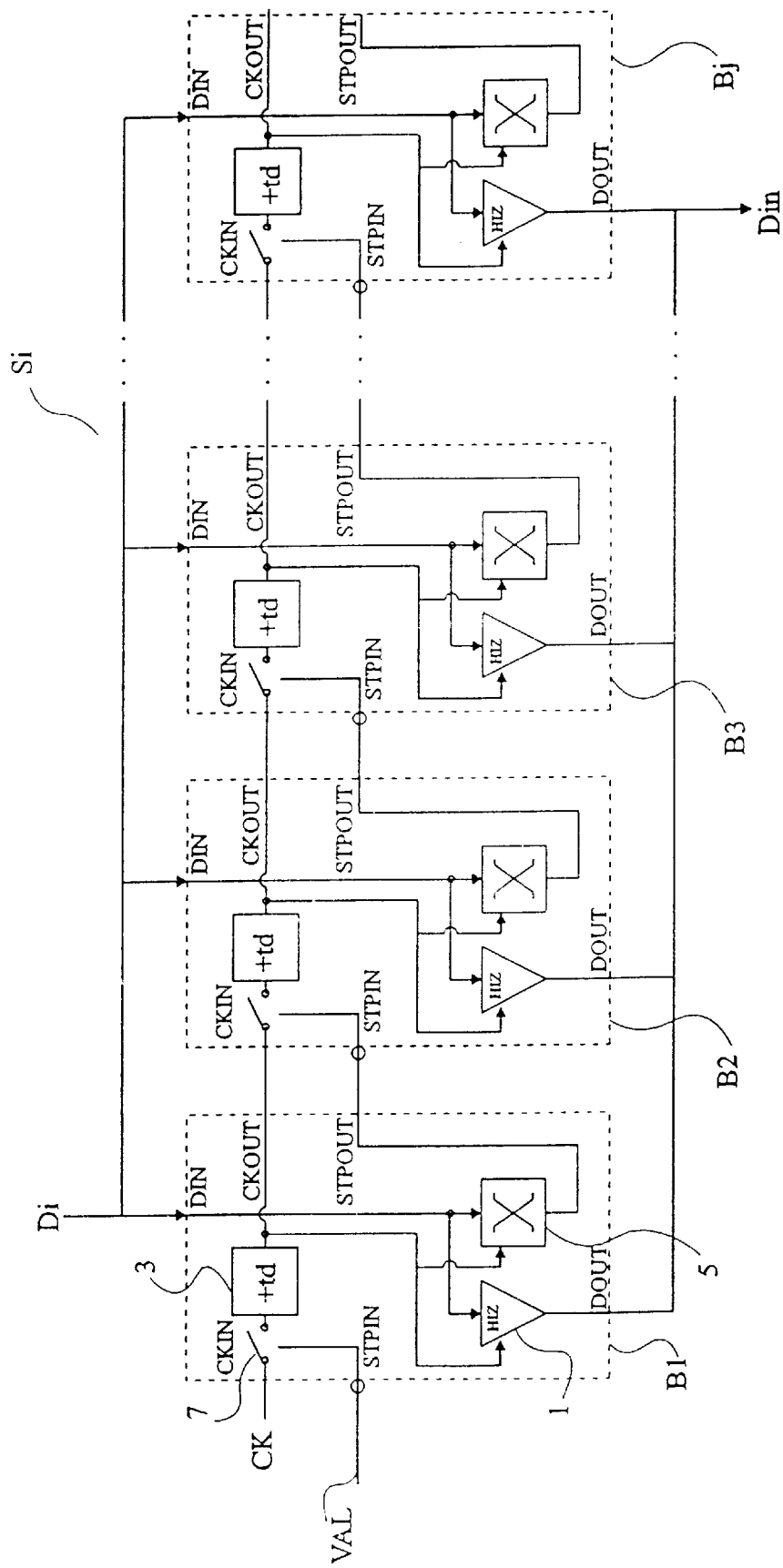
FIG. 3 shows a block diagram of an embodiment of an amplifier according to the present invention.

FIG. 3 schematically shows an embodiment of an amplifier Si performing the functions of those in FIG. 1. It is comprised of j identical elementary blocks B (B1 to Bj).

A block B includes an output stage 1 connected between a data input DIN and a data output DOUT. A delay element 3 is connected between a synchronization input CKIN and a synchronization output CKOUT. Its crossing time is equal to a predetermined time td. An edge detector 5 is connected between the input of output stage 1 and an inhibition output STPOUT.

A switch 7 is interposed between synchronization input CKIN and the input of delay element 3. Switch 7 is connected to be open when the signal present on a deactivation input STPIN is active. The output of delay element 3 is connected to a terminal for setting to a high impedance output stage 1 and to a terminal for activating edge detector 5.

All data inputs DIN of blocks B are connected to input Di of amplifier Si, and all outputs DOUT are connected to output terminal Dir of amplifier Si.

Input CKIN of block B1 receives synchronization signal CK. The output CKOUT of each block is connected to the input CKIN of the next block. The deactivation input STPIN of block B1 receives a signal VAL such that the block is always activated. The deactivation output STPOUT of each block is connected to the deactivation input STPIN of the next block.

Figure 4:
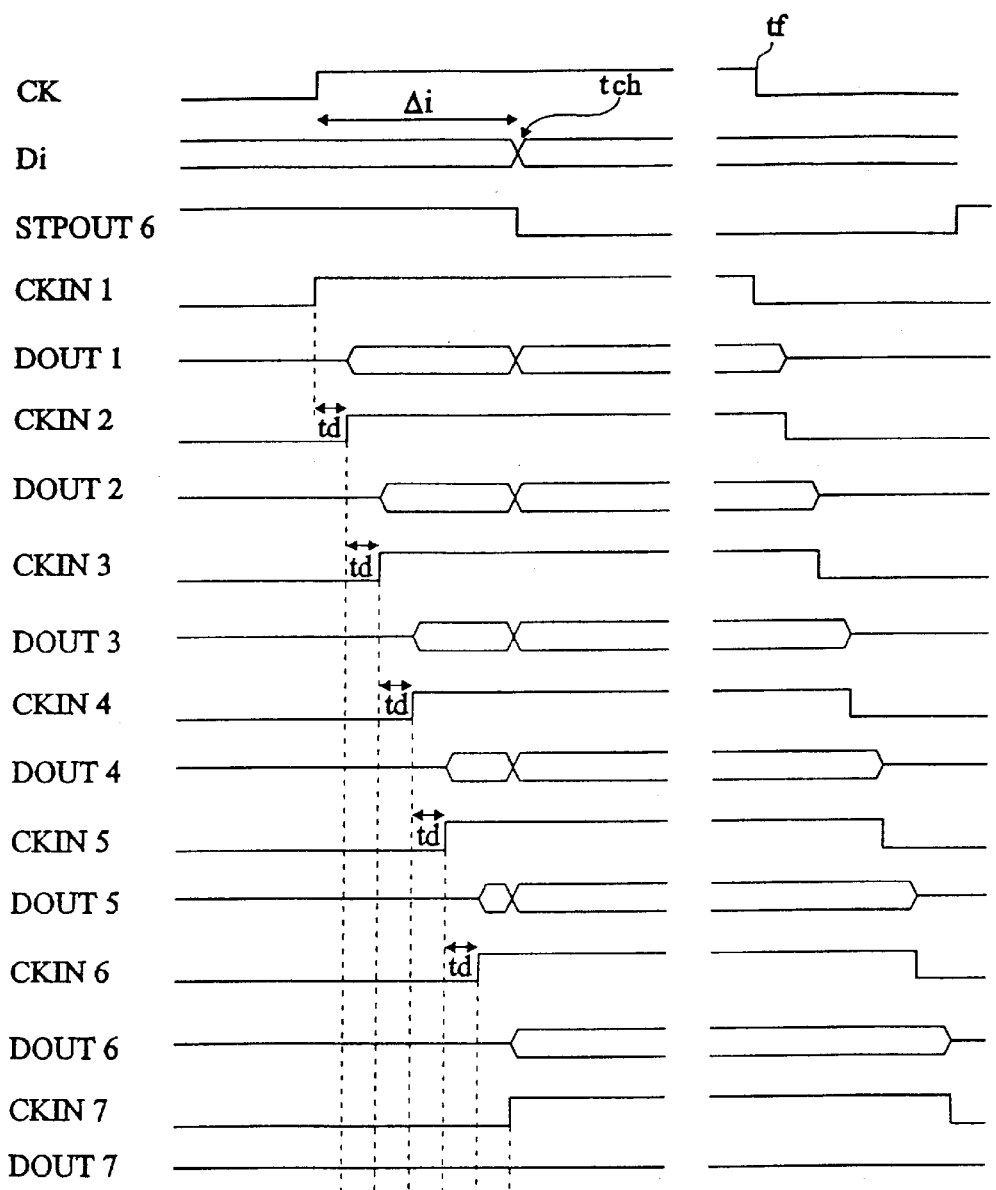
FIG. 4 shows a timing diagram illustrating the operation of an amplifier according to the present invention.

FIG. 4 shows the states of outputs DOUT1 to DOUT7 of the output stages of seven consecutive blocks as well as synchronization signals CKIN1 to CKIN7 which are to successively activate the output stages of blocks B1 to B7. Data signal Di, which changes at a time $t_{ch}$, and a disable signal STPOUT6, active at zero, which represents the disable signal sent onto the disable input of block B7, have also been shown.

The active edge of synchronization signal CK thus propagates from one block B to another, crossing each delay element 3 in a time td. In each block, when the synchronization signal reaches the output of delay element 3, it activates output stage 1 and edge detector 5. When an output stage 1 is activated, its output terminal DOUT switches from a high impedance state to a logic state corresponding to signal Di. It should be noted that when an output terminal is at high impedance, it has no influence upon the voltage of the line to which it is connected. When all terminals DOUT are at high impedance, output line Dr of the amplifier remains by capacitive effect at a voltage close to the last voltage to which it has been brought.

The output stages of blocks B1 to B6 are successively activated by the propagation of synchronization signal CK, and their outputs DOUT1 to DOUT6 successively leave the high impedance state at times separated by intervals td.

When a transition of data signal Di appears at time $t_{ch}$ on input DIN of blocks B, all the blocks B which have been activated, that is, here, blocks B1 to B6, provide on their output DOUT the transition of signal Di. Output stages 1 of the following blocks B remain inactive and at high impedance. Indeed, edge detector 5 of the last block activated at the transition of signal Di (herein, block B6) detects this transition and activates its deactivation output STPOUT (STPOUT6), which opens switch 7 of the next block, and prevents the propagation of the synchronization signal through this block. The next blocks can thus no longer be activated.

In fact, edge detectors 5 of all activated blocks B enable their signal STPOUT at time $t_{ch}$. But when an already activated block receives a deactivation signal STPIN, the latter remains activated as long as synchronization signal CKIN received by the block is active.

If time $t_{ch}$ of the transition of signal Di corresponds to a delay ΔI with respect to an active edge of synchronization signal CK, the number of time intervals td included in delay ΔI determines the number of blocks B that will have their output stage 1 activated.

At a time $t_f$, synchronization signal CK exhibits an inactive edge. This deactivation of signal CK propagates in the successive blocks B, each time delayed by time td, and successively deactivates the output stages and edge detectors 5. The signals STPOUT generated by the edge detectors are deactivated and turn switches 7 back on. The circuit then is in its original state, ready to process a new transition of signal Di.

Figure 5:
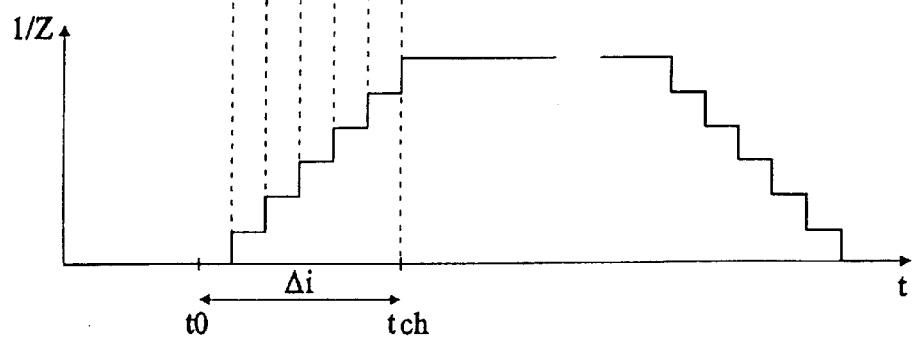
FIG. 5 shows a timing diagram illustrating the time variation of the fan-out of an amplifier according to the present invention.

FIG. 5 shows the variation of the amplifier fan-out, resulting from the timing diagram of FIG. 4. Each activated output stage increases the amplifier fan-out by a value equal to that of an output stage, and the amplifier fan-out increases by equal steps. When a transition of the data signal is detected, the propagation of the synchronization signal is stopped, the amplifier fan-out stops increasing and remains constant until the synchronization signal is deactivated.

Accordingly, the desired amplifier switching time is approached by steps. The steps are defined by delay time td and the fan-out of an elementary block B of the amplifier. To obtain the best step resolution, that is, the best approximation of the desired switching time, the fan-out of an elementary block B is chosen to be minimum. This is obtained by choosing the transistors of its output stage 1 of minimum dimensions. The fan-out variation amplitude is obtained by choosing delay td and the number of elementary blocks.

Figure 6:
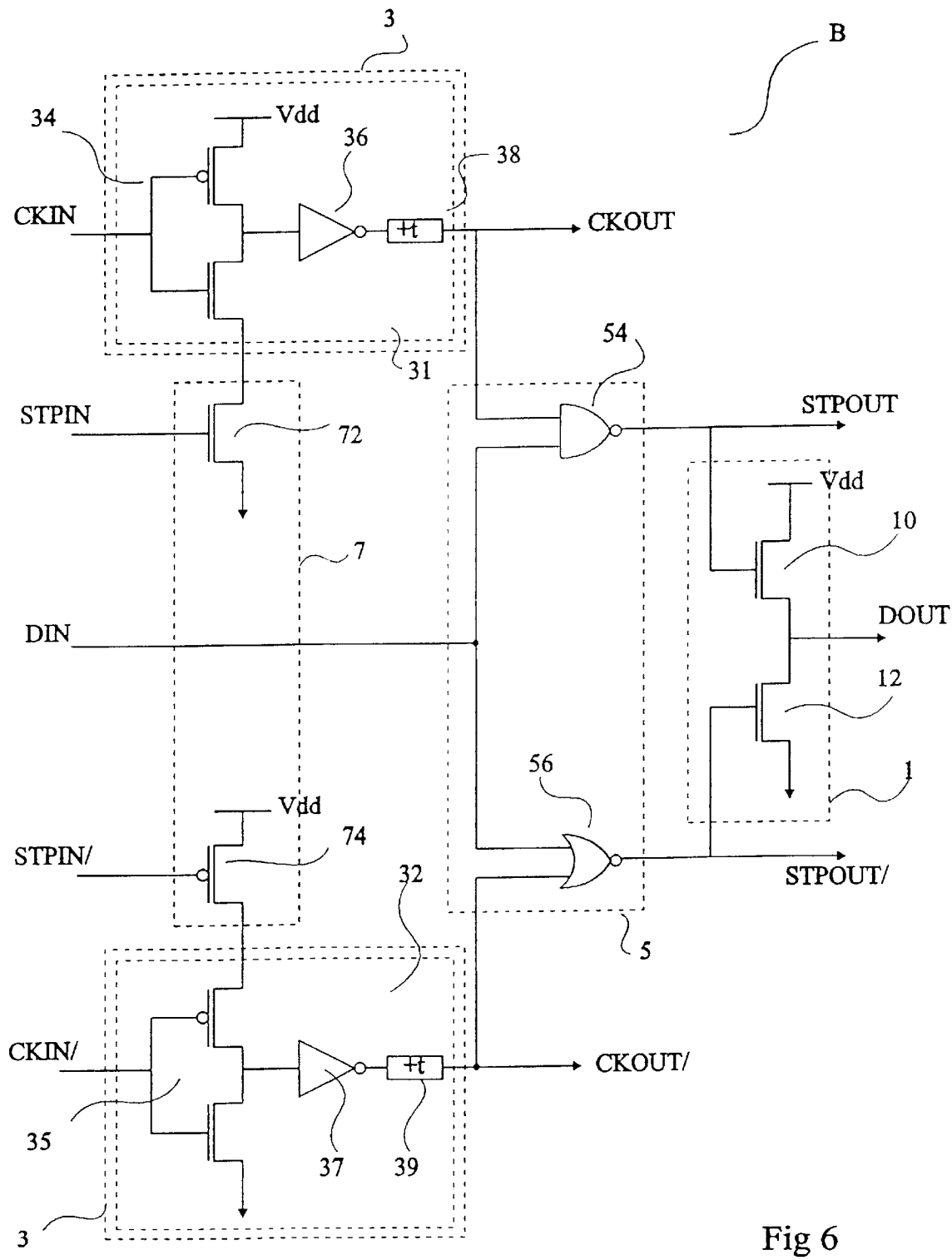
FIG. 6 shows a simplified diagram of an elementary block of the amplifier of FIG. 2.

FIG. 6 shows a simplified diagram of an elementary block B of FIG. 3.

Output stage 1 is an inverter including a P-channel MOS transistor 10 and an N-channel MOS transistor 12.

Delay element 3 is comprised of two blocks 31 and 32, each including an inverter 34 or 35, an inverter 36 or 37, and a delay device 38 or 39 connected in series. Block 31 is connected between terminals CKIN and CKOUT, and block 32 is connected between terminals CKIN/ and CKOUT/. The signals present on terminals CKIN and CKIN/ or CKOUT and CKOUT/ are complementary.

Edge detector 5 includes a NAND gate 54, an input of which is connected to terminal DIN, the other input being connected to the output of block 31, and the output being connected to the gate of transistor 10. The output of gate 54 is also connected to terminal STPOUT. It also includes a NOR gate 56, an input of which is connected to terminal DIN, the other input being connected to the output of block 32, and the output being connected to the gate of transistor 12. The output of gate 54 is also connected to a terminal STPOUT/.

Switch 7 includes an N-channel MOS transistor 72 connected between the ground and a supply terminal of inverter 34, the gate of which is connected to terminal STPIN. It also includes a P-channel MOS transistor 74 connected between a supply voltage terminal Vdd and a supply terminal of inverter 35. The gate of transistor 74 is connected to a terminal STPIN/. Terminal STPIN/ is connected to terminal STPOUT/ of the preceding block.

A synchronization signal provided on input terminal CKIN (or CKIN/) propagates through block 31 (or 32) in a predetermined time td. Synchronization output CKOUT (or CKOUT/) is then activated. If the signal present on input terminal DIN is at 1, the output of NAND gate 54 is brought to zero, which activates deactivation terminal STPOUT. The gate of transistor 10 is also activated, which brings data output DOUT to 1. If the signal present on terminal DIN is at 0, the output of NOR gate 56 is brought to 1, which activates deactivation terminal STPOUT/. The gate of transistor 12 is also activated, which brings data output DOUT to zero.

A deactivation signal provided on terminal STPIN (or STPIN/) turns off transistor 72 (or 74), which prevents an active state of signal CKIN (or CKIN/) from propagating through inverter 34 (or 35) to terminal CKOUT (or CKOUT/). If signal CKIN (or CKIN/) is active when transistor 72 (or 74) is off, signal CKOUT (or CKOUT/) remains active by capacitive inertia until signal CKIN (or CKIN/) is deactivated.

Figure 7:
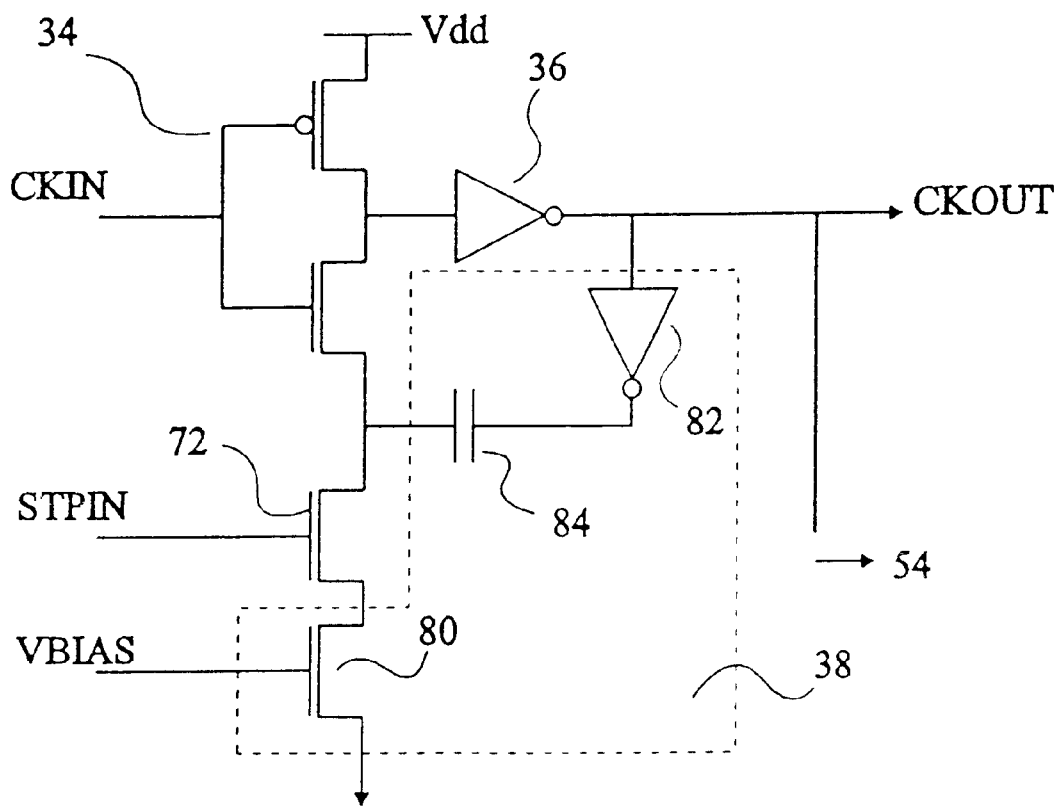
FIG. 7 shows an embodiment of an alternative of a portion of the elementary block of FIG. 6.

FIG. 7 shows an embodiment of block 31 of FIG. 6. Elements 34, 36, and 72 of FIG. 7 are those of FIG. 6. Device 38 includes a current source 80 interposed between transistor 72 and the ground. It further includes an inverter 82 connected at the output of inverter 36, a capacitor 84 connected between the output of inverter 82 and the connection node between inverter 34 and transistor 72. Current source 80 is controlled by a voltage VBIAS.

With this configuration, delay td introduced by the circuit mainly depends on the size of capacitor 84 and on the current provided by current source 80. It should be noted that it is possible to vary this delay by varying the current provided by current source 80.

It is known that the operating speed of the amplifier can drift, for example, with a variation of the conductivity of the transistors forming it, due to a variation of the temperature or circuit supply voltage. It is possible to compensate a drift of the amplifier operating speed by controlling control voltage VBIAS of the current source with the conductivity of the amplifier transistors. The means for obtaining such a voltage VBIAS are conventional and will not be detailed.

Of course, the present invention is likely to have various alterations, modifications, and improvements which will readily occur to those skilled in the art. In particular, an amplifier having the function of increasing the delay of a data signal with respect to a reference signal rather than compensating it can be provided. Such an amplifier, placed on each line of a parallel bus, enables dispersing the edges of signals propagating in parallel and thus limiting the noise generated by these edges. Indeed, when several signals transmitted in parallel switch simultaneously, this generates a strong current surge on the circuit supply and creates noise on the supply lines. Similarly, the simultaneous propagation of signals on a parallel bus can create electromagnetic noise. Thus, there are cases in which it is desirable to desynchronize data transmitted in parallel, to decrease the current surge due to their simultaneous switching or to decrease the electromagnetic noise generated by their simultaneous switching.

A first solution, if the data synchronism is not perfect, consists of amplifying the different offsets existing between each datum and the reference signal. For this purpose, an amplifier similar to the amplifier of FIG. 3 is used, in which all output stages are initially activated, and in which the signal generated at the output of the delay element of a block deactivates the output stage of the block. Thus, the amplifier fan-out decreases in time, and the difference between the signals received by the amplifiers is increased.

A second solution, if the data are perfectly synchronous with respect to the synchronization signal, may consist of randomly varying the number of activated blocks in each amplifier according to time so that the fan-out of each amplifier changes randomly, and is different from one amplifier to another. This enables desynchronizing the data signals by delaying each of them according to a difference random delay.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An amplifier, comprising: a fan-out which varies according to the time spent between an edge of a synchronization signal and an edge of a logic input signal, the amplifier including several identical blocks, each block including:
    an output stage connected between a data input and a data output, the data input and output being respectively connected to the data inputs and outputs of the other blocks,
    a delay element, the delay elements of all blocks being connected in series, the delay element of the first block receiving the synchronization signal,
    an edge detector, the input of which is connected to the input of the output stage, and
    means for inhibiting the propagation of the synchronization signal through the delay element when the signal generated by the edge detector of the preceding block is active and for activating the output stage and the edge detector when the signal generated by the delay element of the preceding block is active.

2. The amplifier of claim 1, wherein each of the blocks includes:
    a first MOS transistor of a first conductivity type connected between a first supply terminal and a data output terminal, and
    connected in series between a synchronization terminal and the synchronization terminal of the next block, a first inverter supplied between the first supply terminal and a second supply terminal via a second MOS transistor of the second conductivity type, a second inverter, and a delay element,
    the gate of the first transistor being connected to the gate of the second transistor of the next block, and being activated when both a data input signal and the signal provided to the synchronization terminal of the next block are activated.

3. The amplifier of claim 2, wherein the second inverter is connected at the output of the first inverter, and the delay element includes:
    an adjustable current source between the second transistor and the second supply terminal, and
    a third inverter and a capacitor, series-connected between the output of the second inverter and the connection between the second transistor and the first inverter.

4. The amplifier of claim 3, wherein the current source is set to provide a decreasing current when the intrinsic conductivity of the transistors increases.

5. An amplifier having an input terminal adapted to receive an input signal, a synchronization terminal adapted to receive a synchronization signal, and an output terminal, the amplifier having a fan-out that is a function of a delay time between a transition of the synchronization signal and a transition of the input signal, and the amplifier driving an output signal on the output terminal from a first logic level to a second logic level in response to the transition of the input signal, the rate at which the output signal transitions from the first logic level to the second logic level being a function of the fan-out, the amplifier comprising a plurality of blocks coupled in parallel between the input terminal and the output terminal, each block comprising:
    a delay element having an input and an output, the inputs and outputs of the delay elements being coupled in series with the input of the delay element in a first block being coupled to receive the synchronization signal, each delay element generating a delay signal on its output a delay time after a transition of the signal from the preceding delay element applied on its input;
    an output stage having an input terminal, output terminal, and enable terminal coupled to the output of the associated delay element, the output stage operable to develop a signal on the output terminal responsive to the input signal when the enable signal is active, and operable to present a high impedance at the output terminal when the enable signal is inactive;
    an edge detector having an input coupled to the input of the output stage and an enable terminal coupled to the output of the delay element, the edge detector generating an edge signal responsive to a transition of the input signal; and
    an inhibit circuit coupled between the delay elements of successive blocks and coupled to the edge detector of the preceding block, the inhibit circuit operable in a first mode to couple the delay element in the associated block to the delay element in the preceding block responsive to the edge signal being inactive, and operable in a second mode to isolate the delay element in the associated block to the delay element in the preceding block responsive to the edge signal being active.

6. The amplifier of claim 5 wherein each inhibit circuit comprises a switch having a control terminal coupled to the output of the edge detector in the preceding block to receive the corresponding edge signal, and including signal terminals coupled between the input and output of successive delay elements, the switch coupling its signal terminals together responsive to the edge signal.

7. The amplifier of claim 5 wherein each of the delay circuits comprises:
    a first MOS transistor of a first conductivity type connected between a first supply terminal and a data output terminal, and
    connected in series between a synchronization terminal and the synchronization terminal of the next block, a first inverter supplied between the first supply terminal and a second supply terminal via a second MOS transistor of the second conductivity type, a second inverter, and a delay element,
    the gate of the first transistor being connected to the gate of the second transistor of the next block, and being activated when both a data input signal and the signal provided to the synchronization terminal of the next block are activated.

8. The amplifier of claim 7, wherein the second inverter is connected at the output of the first inverter, and the delay element includes:
    an adjustable current source between the second transistor and the second supply terminal, and
    a third inverter and a capacitor (84), series-connected between the output of the second inverter and the connection between the second transistor and the first inverter.

9. The amplifier of claim 8 wherein the current source is set to provide a decreasing current when the intrinsic conductivity of the transistors increases.

10. A method of synchronizing a plurality of digital signals applied on respective lines of a bus, the method comprising:

determining for each digital signal a delay time between a transition of the digital signal and a transition of a reference clock signal;

determining for each digital signal a corresponding transition rate, each transition rate having a value that is a function of the corresponding delay time; and generating a respective synchronized digital signal in response to each applied digital signal, each synchronized digital signal transitioning between first and second logic levels in response to a transition of the corresponding digital signal, the synchronized digital signal transitioning between the logic levels at the transition rate and the rates having respective values so that all synchronized digital signals reach the corresponding desired logic level at substantially the same time.

11. The method of claim 10 wherein determining for each digital signal a corresponding transition rate comprises determining a desired slope for each synchronized digital signal.

12. The method of claim 11 wherein determining a desired slope comprises increasing the value of the slope as the delay time increases and decreasing the value of the slope as the delay time decreases.

13. An amplifier, comprising:

a plurality of identical blocks, each block including:

an output stage connected between a data input and a data output, the data input and the data output connected to the data inputs and data outputs respectively of the other blocks;

a delay element, the delay elements of all blocks connected in series, the delay element of the first block receiving the synchronization signal;

an edge detector, the input of which is connected to the input of the output stage; and means for inhibiting the propagation of the synchronization signal through the delay element when the signal generated by the edge detector of the preceding block is active and for inhibiting the output stage and the edge detector when the signal generated by the delay element of the preceding block is active to achieve a fan-out that varies according to the time spent between an edge of a synchronization signal and an edge of a logic input signal.

14. An amplifier having an input terminal adapted to receive an input signal, a synchronization terminal adapted to receive a synchronization signal, and an output terminal, the amplifier having a fan-out that is a function of a delay time between a transition of the synchronization signal and a transition of the input signal, and the amplifier driving an output signal on the output terminal from a first logic level to a second logic level in response to the transition of the input signal, the rate at which the output signal transitions from the first logic level to the second logic level being a function of the fan-out, the amplifier comprising a plurality of blocks coupled in parallel between the input terminal and the output terminal, each block comprising:

a delay element having an input and an output, the inputs and outputs of the delay elements coupled in series with the input of the delay element in a first block coupled to receive the synchronization signal, each delay element generating a delay signal on its output a delay time after a transition of the signal from the preceding delay element applied on its input;

an output stage having an input terminal, an output terminal, and an enable terminal coupled to the output of the associated delay element, the output stage operable to develop a signal on the output terminal responsive to the input signal when the enable signal is active, and operable to present a high impedance at the output terminal when the enable signal is inactive;

an edge detector having an input coupled to the input of the output stage and an enable terminal coupled to the output of the delay element, the edge detector generating an edge signal responsive to a transition of the input signal, and an inhibit circuit coupled between the delay elements of successive blocks and coupled to the edge detector of the preceding block, the inhibit circuit operable in a first mode to couple the delay element in the associated block to the delay element in the preceding block responsive to the edge signal being inactive, and operable in a second mode to isolate the delay element in the associated block to the delay element in the preceding block responsive to the edge signal being active.

\* \* \* \* \*